Nov. 22, 1949 — R. J. HERBOLD — 2,489,218
INSTRUMENT FOR LANDING AIRCRAFT
Filed Nov. 7, 1944 — 4 Sheets-Sheet 1
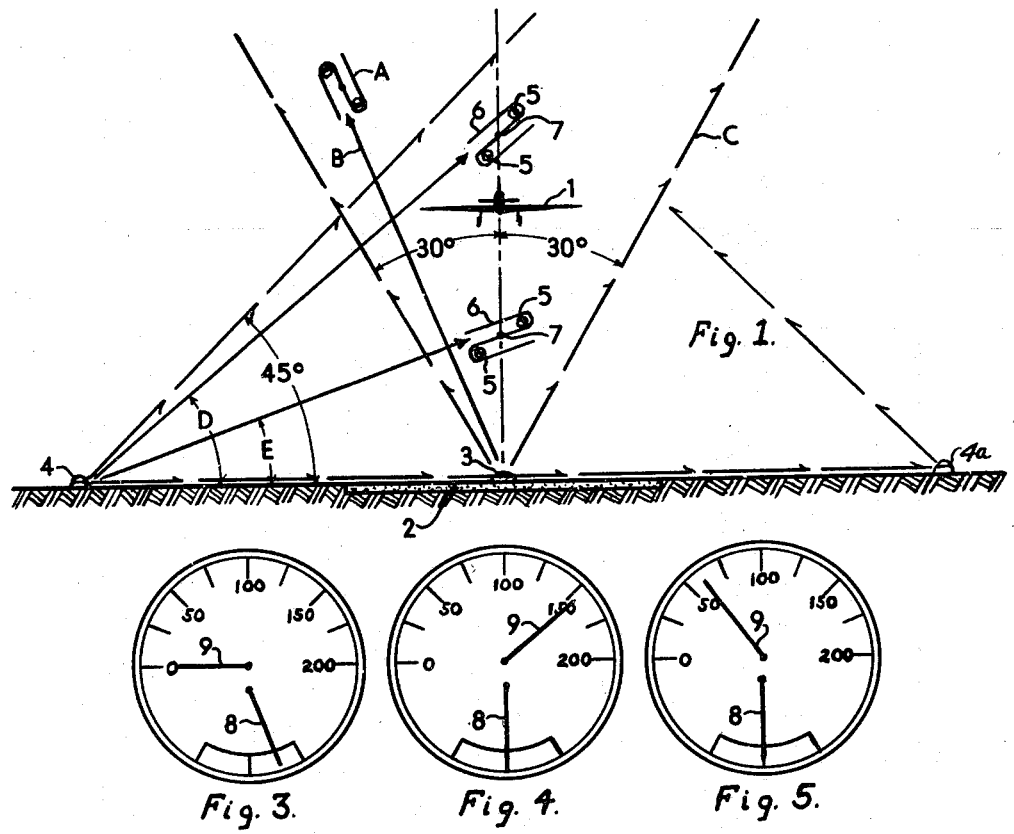
Fig. 1.
Fig. 3.   Fig. 4.   Fig. 5.
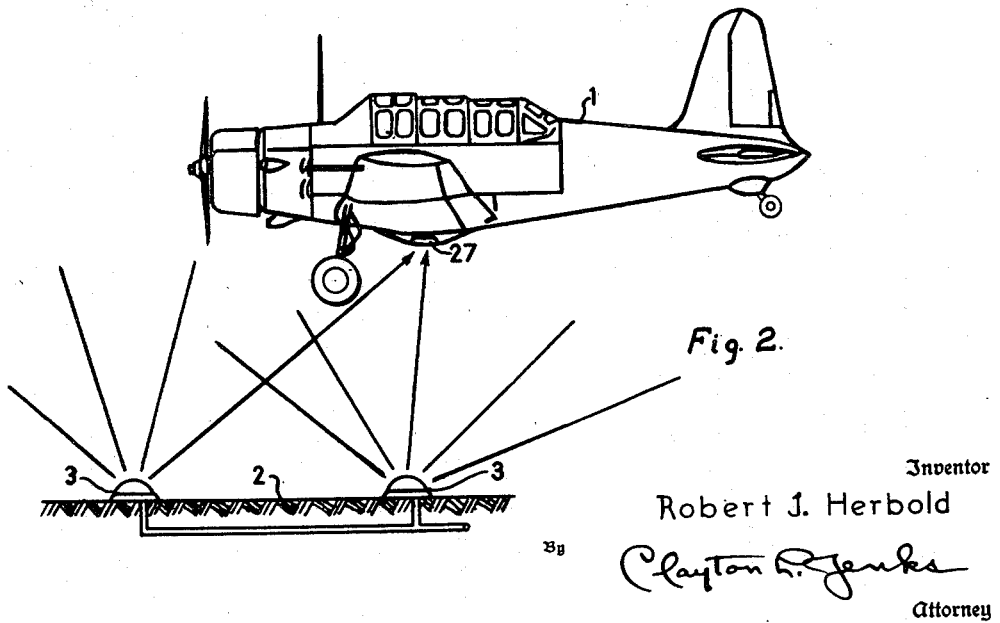
Fig. 2.
Inventor
Robert J. Herbold
By Clayton R. Jenks
Attorney Nov. 22, 1949 R. J. HERBOLD 2,489,218
INSTRUMENT FOR LANDING AIRCRAFT
Filed Nov. 7, 1944 4 Sheets-Sheet 2
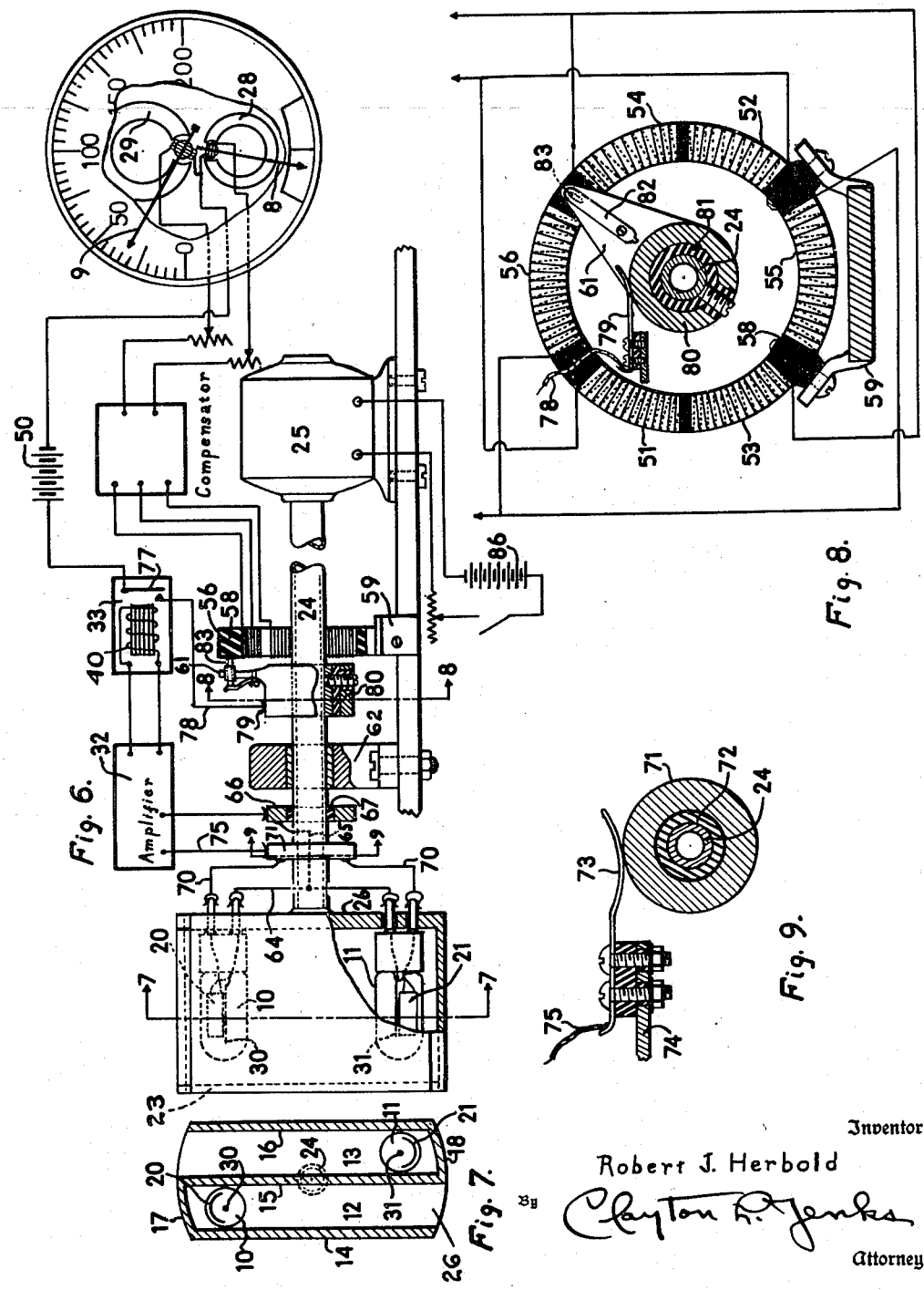
Inventor
Robert J. Herbold
By Clayton R. Jenks
Attorney Nov. 22, 1949    R. J. HERBOLD    2,489,218
INSTRUMENT FOR LANDING AIRCRAFT
Filed Nov. 7, 1944    4 Sheets-Sheet 3

Inventor
Robert J. Herbold
By Clayton R. Jenks
Attorney

Nov. 22, 1949 R. J. HERBOLD 2,489,218
INSTRUMENT FOR LANDING AIRCRAFT
Filed Nov. 7, 1944 4 Sheets-Sheet 4
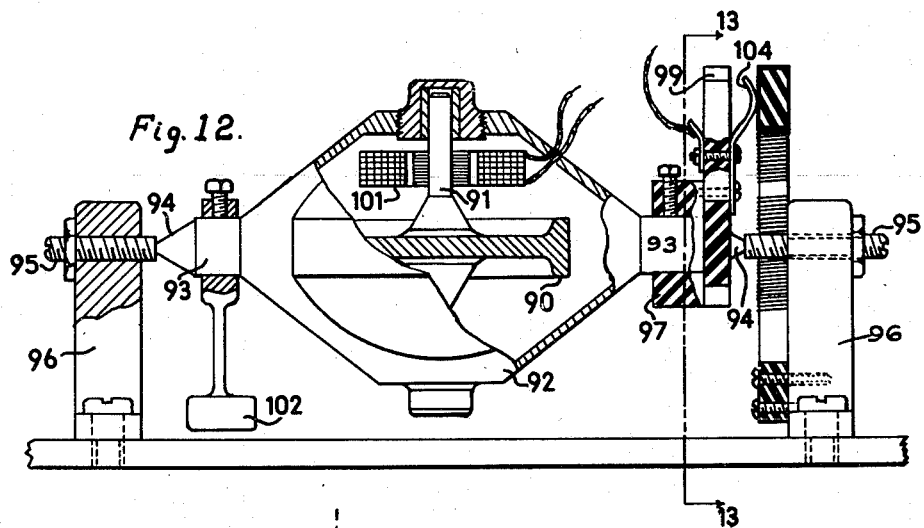
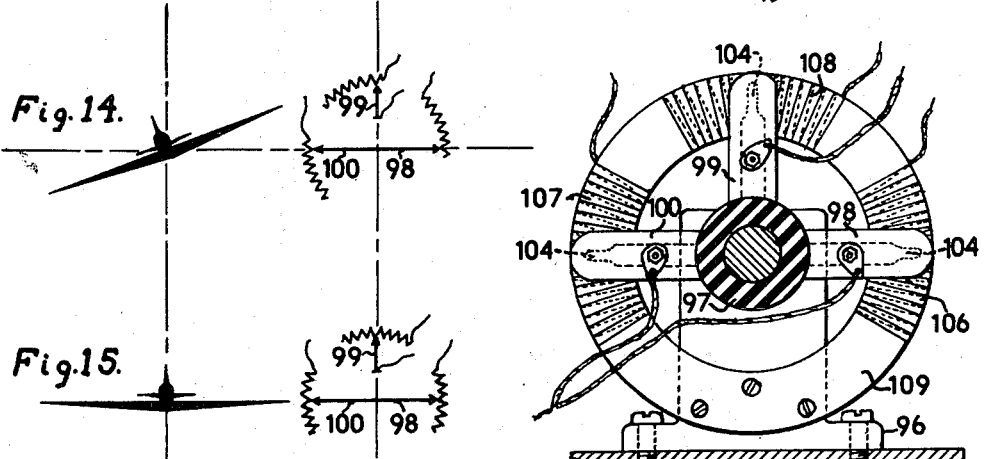
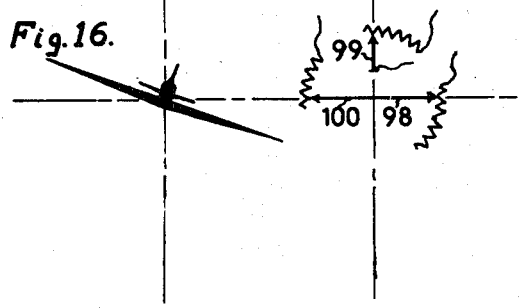
Inventor
Robert J. Herbold
By Clayton L. Jenkins
Attorney Patented Nov. 22, 1949

2,489,218

UNITED STATES PATENT OFFICE 2,489,218

INSTRUMENT FOR LANDING AIRCRAFT

Robert J. Herbold, Denver, Colo., assignor to
Lafayette M. Hughes, Denver, Colo.

Application November 7, 1944, Serial No. 562,353

15 Claims. (Cl. 33—46)

This invention relates to an instrument landing apparatus for aircraft and more particularly to apparatus for the blind landing of aircraft under instrument guidance.

In accordance with systems heretofore employed, aircraft may land at night by following a radio beam directed from a known point at the airport. According to that localizer or glide path instrument approach system, the plane comes down along its glide path for many miles at a fixed angle which may, for example, represent a descent of 100 feet in one mile. This means a dangerously low elevation for a long distance of approach near the airport. On the other hand, a steeper angle of descent might cause a serious impact of the plane against the ground, if the landing were entirely blind. The altitude of the plane has been measured by an aneroid barometer calibrated in feet above the sea level. To use that instrument, the pilot must receive advance information by radio message giving the barometric pressure at the airport and then calibrate his instrument accordingly. There are errors in the instrument due to changes in pressure and temperature under variable weather conditions. Such an altimeter is not accurate and it may give too high a reading for a given altitude. There has been a permissible allowance of 50 feet variation in the reading of such an instrument, and this, of course, is sufficient to cause the aircraft to crash in a blind landing. A radio altimeter indicates the altitude above the terrain over which the plane flies and this is operated by a radio beam reflected from the rock formations on or beneath the surface of the land. Such an instrument is difficult to use during flight and it may give inaccurate results. The pilot employing the standard landing system must watch three or more instruments, including a radio compass, the localizer and glide indicator and an indicator light which flashes when the plane passes the marker beacon. The aligning radio beam is necessarily a narrow band near the runway and if the angle of approach deviates by, say, 10°, it will be necessary for the pilot to climb again and circle for a new attempt at landing. These instruments require that he know the landing field and its environment, and it is practically necessary for him to see the landing field and estimate his altitude above the runway. However, there are various errors in depth perception on the part of the pilot. For example, if he should have flown at a high altitude, such as 30,000 feet, and then come in for a landing, there is often a physical failure of his brain and eye to estimate the correct altitude and he may crash. Hence, it is generally necessary that the pilot not only follow his radio beam for a long period of time at the required angle of approach, but that when he is over the runway he see the latter with sufficient clearness to judge his altitude.

The primary object of the present invention is to overcome the above outlined problems and to provide an instrument landing apparatus therefor which will enable a pilot to land an aircraft successfully on a landing strip which he cannot see.

Another object is to provide instrument indications on an aircraft in flight of altitude, alignment, progression and rate of change of altitude.

A further object is to provide apparatus which progressively indicates the altitude and the changes thereof as the plane approaches and descends over the landing strip.

A further object of the invention is to provide an indicating mechanism which insures proper alignment of the descending aircraft with the landing strip while approaching and flying over the same.

A further object is to provide instruments for use in a blind landing system and without the aid of advance radio information whereby the pilot is guided into a direct alignment with the landing strip and can observe, without seeing the ground, the altitude at which his plane is flying above the airport and thus insure that he bring the plane onto the landing strip under safe control.

A further object is to combine the altitude and alignment indicating devices in a single instrument and thereby minimize the confusion and mental effort required by the pilot in making a landing.

A further object is to provide an instrument landing system embodying apparatus which will operate satisfactorily irrespective of local atmospheric conditions and particularly while vision of the airport is obscured by fog, rain, snow, dust or other particles suspended in the air which would normally hinder or defeat a successful landing.

A further object is to overcome the dangers involved in landing an aircraft under the present radio controlled systems, which may give temporary false indications of aircraft position owing to atmospheric conditions affecting the radio beam or due to failures of the beam sending apparatus.

A further object is to provide a blind landing system and apparatus therefor whereby a plane may approach an airport at a comparatively high altitude and then at a fairly rapid rate make a descent to a safe altitude where an instrument guidance system may be employed to guide the plane to the ground. Various other objects will be pointed out or made apparent in the following disclosure.

I propose to utilize electromagnetic waves, and preferably light waves within the range of the infrared, the visible light and the ultra violet waves, for the purpose of operating a pilot guiding or control instrument located on the plane. Light waves, and especially the infrared rays, are directed from two light sources fixed on the ground and spaced by a known distance. One may extend in the direction of the runway or be aligned with its center line, so as to provide a beam to direct the plane towards and into alignment with the landing strip. The other light source may be arranged to direct light rays, forming an altimeter beam, from a line spaced by a known distance from but parallel with the proper line of approach of the aircraft, so that the beam is received at an angle of less than 90° to a vertical line. The aircraft carries one or more light sensitive elements arranged to receive light beams from the two spaced sources on the ground, and the electrical impulses thus derived are translated electrically, by what we may term instrument triangulation of the angle of reception of a light beam, as the position or alignment of the aircraft and its altitude relative to the runway.

In accordance with a preferred embodiment of my invention, the plane is equipped with electronic apparatus including a light sensitive element which is capable of being activated by the two lines of light on the ground. A shield serves to restrict activation of the element to a unidirectional beam of light. Mechanism is provided for causing an angular movement of the element and shield laterally of the line of flight of the craft so that the element faces and is activated by only one line of light at a time. The momentary electrical impulse derived by such activation is preferably amplified and employed to actuate or control the guiding apparatus. In order to obtain an indication of the aircraft's position and altitude, I may employ apparatus which comprises a moving, and preferably a revolving, photosensitive electron emission tube which is so shielded that it picks up a light beam only when it is in a given angular position relative to a vertical line. The electrical impulse thus generated when the tube is activated by the angularly directed altitude indicating beam is amplified and serves through suitable instruments to indicate that momentary angular position of the phototube, and this position is translated into the altitude of the craft. When the moving photocell picks up the alignment beam, the amplified current thus generated moves an instrument needle to a position which corresponds with the angle of reception of the aligning beam, so that if the plane is directly over the aligning beam this needle will point vertically and show a true alignment with the landing strip.

Referring to the drawings which illustrate a preferred embodiment of this invention:

Fig. 1 is a schematic view showing the relationship of the airport guiding lights and the angles of reception of light beams therefrom as received by the phototubes;

Fig. 2 is another diagrammatic scheme taken at right angles to the view of Fig. 1 and showing the relationship of an aircraft to the guiding lights;

Figs. 3, 4 and 5 are views of the indicating instrument with the altimeter and alignment indicating needles in different positions;

Fig. 6 is a longitudinal view, partly in section, through the phototube assembly and associated electrical connections and revolving parts, and including a diagrammatic showing of certain features of the wiring;

Fig. 7 is a sectional view of the phototube device taken on the line 7—7 of Fig. 6;

Fig. 8 is a view of the altimeter and alinement resistances, the section being taken on the line 8—8 of Fig. 6;

Fig. 9 is a section on the line 9—9 of Fig. 6;

Fig. 12 is an elevation, partly in section, of gyroscope mechanism which compensates for any tilting of the plane;

Fig. 13 is a sectional view taken on the line 13—13 of Fig. 12; and

Figs. 14, 15 and 16 are schematic views showing the relationship of the gyroscopic compensator to the different positions of aircraft.

Figures 10, 11:
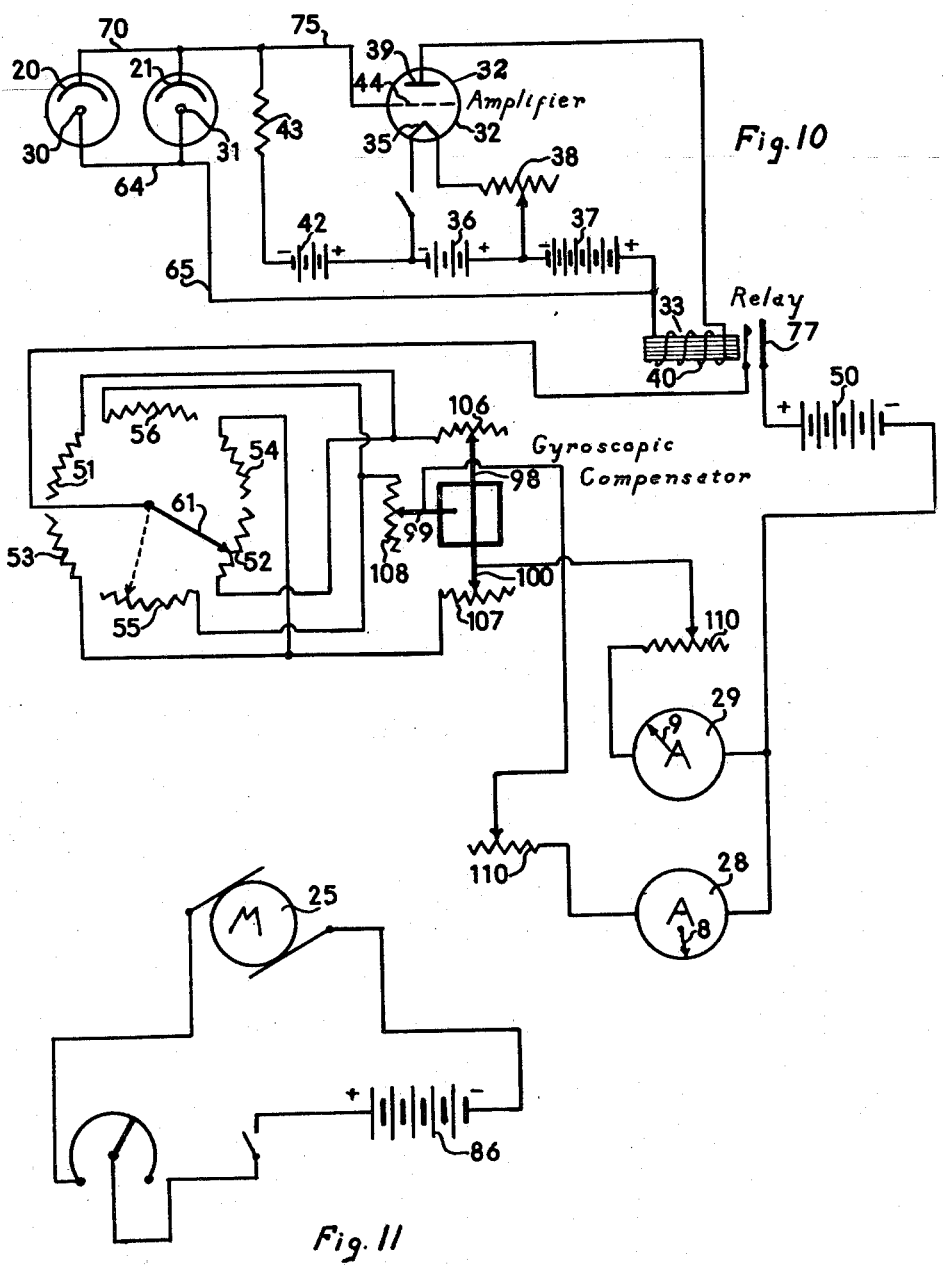
Fig. 10 is a diagrammatic view of the wiring of the phototube amplifying system and the relay controlled circuit which operates the indicating apparatus.
Fig. 11 is a simplified wiring diagram of the motor operating circuit.

The landing system is illustrated in Figs. 1 to 5 inclusive. When the plane 1 approaches the runway strip 2 over the ground, it picks up an alignment light beam from a light source 3 located in advance of and in alignment with the runway; and in order that the plane may be guided throughout a considerable distance before it reaches the runway as well as along the runway, herein termed the effective distance of runway approach, this light source may consist of a series of infra red bulbs or other lights arranged over the terrain in the vertical plane of the center line of the runway. A further source of light 4 consists of a series of infra red or other lights arranged parallel with the center line of the runway and a forward extension thereof and at a known distance therefrom, so that the plane progressively picks up these angularly directed beams as it comes in towards the port. These angle indicating lights may be shielded, if desired, so that the light beams fall within an angle of, say, 45°, from a horizontal, as indicated in Fig. 1. The aligning beam may also be shielded so that its beam falls within an angle of 30° on each side of a vertical line. Two photosensitive electron emission elements 5 are mounted within two oppositely directed shielding tubes or wells 6 open at their ends, and the photo elements are revolved about the center line 7 of the assembly. Each element 5 will successively pick up the light beams from the sources 3 and 4 as it is directed towards each light source. That is, when a plane approaches the runway and the shielding tube 6 is revolved, then its photosensitive element will pick up the light beam from the source 3 only when the tube is in direct alignment with or faces one of the row of lights 3. If the airplane is in position A at the left of the center line of the landing strip, then the center line of each tube carrying the photo element 5 will necessarily lie at an angle to a vertical line, as indicated by the line B of Fig. 1. This may be visually indicated by the position of needle 8 of the instrument shown in Figs. 3, 4 and 5. That needle points, in the preferred apparatus, directly towards the runway. If the plane is located at the right, the photo element picks up the light at an angle represented by the line C and the needle points down towards the left and so tells the pilot to move in that direction.

Similarly, when that revolving photosensitive element 5 is so positioned or is at such an angle as to pick up the angle indicating beam from the light source 4, then an associated instrument triangulates that angular direction of the photosensitive tube and the instrument needle 9 reads in terms of feet above the ground. It will be appreciated that the angle D for a given position of light tube may be readily calibrated so that the needle 9 reads the altitude (Fig. 4), since the distance from lights 4 to the center line of the runway is known. As the plane comes down to the position of the angle E, the altitude will be similarly accurately indicated as shown by needle 9 in Fig. 5. The altitude indication is accurate only if the plane is in alignment with the aligning beam. When the plane is out of the range of the altimeter beams, then the needle 9 rests at zero, as shown in Fig. 3. Thus, the pilot merely has to bring his plane into alignment with the airport landing strip, as indicated by needle 8, and then watch needle 9 which indicates his altitude while holding the plane in the proper line of flight; and whether or not he can see the landing strip he knows his altitude above that strip. Also, by knowing his speed and the rate of descent movement of needle 9 he can determine whether or not he is making a proper landing.

A preferred type of apparatus embodying the above outlined system of blind landing is illustrated in Fig. 6 and associated figures. In general, the construction comprises a photosensitive tube, and preferably two tubes 10 and 11 (Figs. 6 and 7), mounted at the bottom of two open ended light wells 12 and 13 which are rectangular in cross section and are formed by the parallel walls 14, 15 and 16, the two bottom walls 17 and 18 and the front and rear walls 23 and 26. The arcuate shaped cathodes 20 and 21 of the two photoemission tubes 10 and 11 are so arranged near the bottom walls and remote from the openings of the light wells 12 and 13 that their sensitive concave surfaces face towards the open ends of their respective light wells so that they may be activated only by those unidirectional light beams which extend into the wells in a direction substantially parallel with the opaque and light shielding walls 14, 15 and 16 or the center lines of the wells. The outer walls of the phototubes 10 and 11 are either provided with light transmitting windows or are made of material which permit the passage of the selected rays of light that are to activate the cathodes; and various constructional features well known in the art will be employed for the purpose of providing and operating these electric eyes or photosensitive tubes.

Each photo device, comprising the photosensitive tube at the bottom of its light well, is moved, and preferably revolved, about the center line of a suitably supported shaft 24 connected to a suitable electric motor 25 driven from any source of power, such as a battery 86, as indicated in Fig. 11.

The shaft 24 is secured to the rear wall 26 of the photo device, so that the cathodes of the tubes may move continuously through a 360° angle and thus pick up the light beams projected from the airport. The entire device is suitably mounted, such as in a compartment 27 (Fig. 2) on the bottom of the plane, with the shaft 24 extending lengthwise of the plane or parallel with its direction of flight so that the cathodes of the photo devices sweep periodically across the field of projection of the two beams from the lights 3 and 4 when the plane is properly located for that purpose.

The phototubes are connected with a battery or other source of power, such as a generator or a transformer, and the electrical impulses set up when the cathodes of the tubes are successively activated may be used directly, but are preferably amplified, so as to actuate a relay circuit which controls the two needles 8 and 9 of the sensitive galvanometers 28 and 29, or other types of meters of suitable construction and which need not be here described. Various amplification systems may be employed, but I have illustrated in the drawings a simplified construction for the sake of clarity. As shown by the wiring diagrams in Figs. 6, 8 and 10, the anodes 30 and 31 of the two phototubes are connected in parallel and the cathodes 20 and 21 are likewise in parallel. The electrical currents set up when the activated cathodes provide a stream of electrons are successively amplified by an electron emission tube type of amplifier 32 and associated devices, and the current thus produced is employed to operate a telephone or other type of relay 33 which controls the circuit that actuates the galvanometer needles.

The amplifier 32 may comprise a triode gas filled or vacuum tube (Fig 10) having its cathode filament 35 indirectly heated, or preferably directly heated, by a filament heating battery 36. In the forward circuit illustrated, wherein the light reception causes an increase of current in the relay circuit, a plate battery 37 is connected through a resistance 38 with the cathode filament 35 and the anode plate 39, this circuit including the winding 40 of the relay magnet. A grid bias battery 42 is likewise connected through a variable resistance 43 with the grid plate 44 of the triode tube, and it is intended to bias that plate with the required negative potential. The connections with the phototubes are such that when either of the cathodes 20 or 21 of the phototubes is activated and thus sets up a stream of electrons flowing to the anode 30 or 31, the negative potential of the grid is reduced and sufficient electrical current passes through the tube 32 to activate the relay 33. Various constructions of photo-tube relays may be employed for amplifying the electrical impulses received when the phototube cathodes 20 or 21 are activated.

When the switch of the relay 33 is closed, a current from the battery 50 or other source of power is sent into one of the pair of altimeter resistance coils 51 and 52 (Figs. 8 and 10) which are connected in parallel, or one of the coils 53 and 54 connected in parallel, or one of alignment coils 55 and 56 connected in parallel. The resistance coils 51 to 56 inclusive (Figs. 6 and 8) are made of exposed wires wound to form isolated segments which are mounted on a fixed annular insulating support 58 concentric with shaft 24 suitably carried by a supporting structure 59 on the airplane, so that the resistances are stationary relative to the revolving shaft 24 and the phototubes carried thereby. These resistances are separately brought into an ammeter circuit only when a contact arm 61, which is secured to and revolves with the shaft 24, makes a connection between one of them and the battery 50.

As the tubes and arm 61 revolve, the latter sweeps over the resistances in succession and progressively varies the resistance in the ammeter circuit. The shaft 24, which is mounted on a bearing support 62, may be rotated in either direction by its motor 25, and the resistance is either increased or decreased by movement of the contact arm. For example, when the contact arm 61 projects substantially vertically upwardly or downwardly, it will contact with one of the resistances 56 or 55. Then at that moment one of the phototubes is in position to receive a substantially vertically projected light beam. For the position of arm 61 in Fig. 10 one of the tubes will pick up a light beam directed from light source 4, since the arm 61 and its associated tube make an angle within 45° of the horizontal line passing through the axis of the shaft 24.

While the revolving arm 61 holds its contact with coil 51 or 52, or the other pair 53 and 54, then if one phototube picks up a light beam, this results in an instantaneous electrical impulse in the ammeter 29 connected at that moment in the circuit. It will be noted by reference to the circuits of Fig. 10 that the other ammeter 28 is not actuated at that instant, because a circuit has not been made through arm 61 with either of the resistances 55 and 56, the only ones connected to that ammeter. Similarly, when the contact arm 61 gets around to a position at which it strikes either of the resistances 55 or 56, then any electrical impulse generated in an activated phototube at that time is amplified to cause movement of the needle 8 of the plane aligning galvanometer 28.

The resistance segments 55 and 56 are made to subtend such angles that the aligning beams will actuate the needle 8 only while the light beam from source 3 lies within substantially a 60° angle. Also, the lights 4 are positioned far enough from the runway so that their directed beams will make such angles with the phototubes that the resistances and associated ammeter will indicate the direction of the light beam for all required positions of the plane above the ground. That is, the light beam and the arm 61 are substantially horizontal when light is picked up by the phototube on a grounded plane; and the lower end of each resistance 52 or 53 is so located that when the plane is aligned with the runway the light activation of the photocell will be indicated by needle 8 for altitudes up to at least 200 feet. For an elevation of 200 feet, if the lights 4 are shielded to project only within the 45° angle indicated in Fig. 1, then the row of lights 4 should be located 200 feet from the runway center. Obviously, a wide variation in these geometrical relationships may be made.

The electrical impulses will be received twice for each revolution of the shaft 24, since there are two phototubes arranged at 180° to each other. The shaft is revolved at that speed, such as 300 R. P. M., and the galvanometers are sufficiently dampened, as by eddy currents or air vanes, so that the ammeter needles will not oscillate materially under the succession of electrical impulses. This type of instrument is well known in the electrical industry and need not be described.

Referring now to the constructional details shown in Figs. 6 to 9 inclusive, it will be appreciated that the phototubes 10 and 11 may be suitably constructed and mounted. The anode wires 30 and 31 of these tubes are connected by suitable plugs and sockets carried by the base 26 of the revolving phototube carrier. This is accomplished by means of a wire 64 (Fig. 6) passing through holes and into the interior of the hollow shaft 24. The wire 64 connects with a further wire 65 soldered to a metal ring 66 which is carried by the shaft 24 but insulated therefrom by a rubber bushing 67. Similarly, the cathode plates 20 and 21 are connected through posts and sockets with wires 70 which have their terminals soldered or otherwise suitably secured to the metal plate 71 (Fig. 9) that is mounted on the shaft 24 but insulated therefrom by a bushing 72. The current is picked up by a resilient collector arm 73 suitably mounted on and insulated from the framework 74 of the aircraft, and the wire 75 leads from that collector to the grid plate 44 of the amplifier tube 32. Hence, activation of the phototube develops a stream of electrons therein which serves to reduce the negative grid potential and cause the flow of electrons and a current from the heated filament to the anode plate of the amplifier tube and so actuate the relay.

When the core of the electromagnet formed by the turns of wire 40 of the relay 33 is energized (Figs. 6 and 10), the relay switch arm 77 is drawn forward to close the circuit in the line carrying the batteries 50. The current passes from that relay switch contact through a wire 78 (Figs. 6 and 8) to a sliding contact arm 79, similar to arm 73 of Fig. 9, and then into the metal sleeve 80 which is insulated by the bushing 81 from the shaft 24. That sleeve 80 carries the metal arm 61 which sweeps continuously over the exposed but spaced coils of the resistances of Fig. 8 as above described. A suitable metal spring 82 carried by the arm 61 presses the sliding contact 83 (Fig. 6) into firm engagement with the turns of wire of the several resistances. Thus the arm 61, which is parallel with the directions of the light beams that activate the cathodes 20 and 21, sweeps continuously over the resistances and connects them progressively with the amplifying circuit of the phototubes, so that the ammeters successively indicate the instantaneous electrical conditions at the moment of light activation.

Since the plane may not fly on an even keel, I provide a suitable gyroscopic device to insure that the tilting motion of the plane does not affect the measurements. This preferably comprises a gyroscopic compensator which cuts in or out a resistance equal to that which it cut out or in by any tilting motion of the airplane about its longitudinal axis. That is, the resistances 51 to 56 inclusive are fixed to the airplane and are necessarily tilted relative to the activated position of the revolving arm 61 as the plane itself tilts laterally. But the photoeye receives a directed light beam at a definite angle relative to a vertical plane for any given position of the plane, and the arm 61 and associated ammeter needles indicate that angular position of the arm relative to the resistances. Hence, tilting of the plane would give a false reading on the ammeter if compensation were not made. Any pitching of the plane will not affect the operation of this instrument materially.

A simple type of compensating device comprises a gyroscope, as shown in Figs. 12 and 13, having a massive wheel 90 mounted to rotate about an axis 91 which is carried in bearings in a gimbal frame 92 arranged to swing about an axis which is longitudinal of or in the direction of movement of the plane. The gyroscope wheel 90 is suitably rotated by an electric motor 101, and owing to its inertia, that wheel tends to maintain the gimbal frame 92 in a vertical position irrespective of the lateral tilting of the plane. The frame 92 is fixed to two aligned shafts 93 having bearing points 94 suitably mounted in adjusting screws 95 which are carried by uprights 96 secured to the aircraft structure. A weighted arm 102 serves to hold the frame 92 in a definite position when the gyroscope is not in operation. The shaft 93 carries an insulating bushing 97 secured thereto and this in turn carries three arms 98, 99 and 100 fixed to and projecting therefrom. Each of these arms has a spring pressed clip 104 shaped as shown in Fig. 12 and arranged to sweep over and contact with the exposed turns of one of the resistance segments 106, 107 and 108 (Figs. 10 and 13). The arms 98 and 100 are electrically connected while arm 99 is insulated therefrom. The resistance 106 is electrically connected in series with resistances 51 and 52, and resistance 107 is connected in series with resistances 53 and 54. Resistance 108 is connected in series with resistances 55 and 56. These several resistances are each equal to each of the resistances connected thereto. The resistances 106, 107 and 108 are made of spaced turns of exposed wire coiled, as shown in Fig. 13, on an insulating ring 109 so that the resistances are concentric with the center of the shaft 93.

Since the gyroscope is mounted to hold the contact arms 98, 99 and 100 in fixed positions no matter how the ring 109 and its resistances tilt, then the contact arms will cut in an amount of resistance equal to that cut out of the resistances of Fig. 8 and thus maintain a constant current for measurement by the ammeter irrespective of the tilting of the plane. This is illustrated diagrammatically in Figs. 14 to 16 inclusive. When the plane has its wings arranged horizontally, as shown in Fig. 15, the contact arms are mounted to strike the middle points of each of the resistance coils 106, 107 and 108 and the total resistance in each circuit equals that half of the resistance added to that connected in by the resistor arm 61. If now the craft tips, as shown in Fig. 14, to a position in which the resistor arm 61 adds too much resistance to the circuit, the gyroscopic compensator will cut out resistance, as shown by the positions of the contact arms and resistance coils. Similarly, a tilting of the aircraft in the opposite direction (Fig. 16) causes the compensator to add resistance equal to that cut out by the false position of the contact arm 61. The variable resistance 110 (Fig. 10) may be included in each of the ammeter circuits for correction and calibration of the instruments.

For the source of light waves, I prefer to use a source of electromagnetic waves between 2000 and 20,000 Angstrom units. For example, I may use standard electric light bulbs but I prefer a "Westinghouse" radiant heat drying lamp, and preferably of at least 250 watts power. Such a lamp gives a high radiation between 7000 and 18,000 Angstrom units, and so is available as a source of infrared waves which will penetrate fog, cloud, dust, snow, sleet, rain, or other atmospheric storm conditions and so activate the landing instruments within distances of 1000 feet or more. I prefer that the aligning beams reach at least 1000 feet altitude, while the altimeter beam may not be required at such a height, since the aircraft will come in on a radio beam and need not be guided otherwise until it is within 200 or 300 feet of the ground for the average local terrain. Various other sources of light or other electromagnetic waves may be employed.

For the electromagnetic wave reception elements, there is likewise a wide choice, depending on the type of waves to be received. For light waves, as above defined, I prefer to use photosensitive elements which are electron emissive, such as a standard electric eye phototube, but I may use a photoconductive element, such as a selenium cell, or a photovoltaic element, such as a copper oxide cell. A satisfactory electron emissive tube comprises an arcuate shaped cathode of silver coated with caesium oxide and an anode of wire mounted at the axis of the cathode arc which are sealed in a glass envelope filled with a low pressure gas or provided with a vacuum and adapted to conduct the required waves or having an infrared transmitting window therefor. Light waves, and particularly the infrared, cause the emission of electrons from the light sensitive cathode surface which result in the passage to the anode of an electric current desired from a suitable source, such as a battery. I may use a "General Electric" argon gas filled phototube PJ23, which is most sensitive to wave lengths between about 3000 and 12,000 Angstrom units and is particularly useful for waves above 7000 Angstroms. The tube and battery circuit is, of course, selected to give ample current for actuating the relay under all required distances and atmospheric conditions. Also, phototubes may be arranged in a cascade, if desired, to amplify the electron emission caused by the radiant energy.

The amplifier tube is likewise of suitable standard construction and its circuit will depend on the nature of the tube, whether triode, tetrode, pentode or other type; and multiple stage amplification may be employed, if desired. The triode of the drawings has a directly heated filament wire cathode, an anode plate and a grid therebetween, such as a "General Electric" 12 battery type or a 45 transformer type amplifier tube.

It will be appreciated that the description of the types of tubes and the circuits has been simplified for the sake of clarity, but that one skilled in the art may employ any suitable electrical apparatus and wiring for the purposes of my invention. Also, transformers with associated condensers, etc. may be employed in place of batteries for the sources of power, since the electron tubes act as rectifiers. The power circuits will, of course, be adjusted to give a maximum desired electron emission in the different tubes under the worst atmospheric conditions and the desired maximum distance of the craft from the ground.

The ammeter 28 is to be so calibrated and have its needle 8 so set that the needle will point preferably vertically downwardly when the arm 61 lies in a vertical position projecting either upwardly or downwardly. The needle 8 should point towards the center line of the landing strip or in the same direction in which the photocell cathodes and the contact arm 61 point. This is a matter of so calibrating the instrument that when all of either resistance 55 or 56 is cut into the circuit the needle 8 will be at a zero position to the left of a vertical line, and when all of the resistance is cut out, then the needle 8 will point to its maximum reading. Thus, the needle 8, which may be made as visually conspicuous as needed, tells the location of the center line of the landing strip, and the pilot needs merely to move his plane laterally in the direction to which the needle points until the needle swings down to its vertical position. Having accomplished this alignment of the plane with the landing strip while the plane is well above the ground, the pilot then views the readings of the other needle 9 of ammeter 29 and progressively notes the change in altitude, and he may determine the rate of descent from his knowledge of plane speed. The altitude ammeter 29 may be so calibrated and the needle 9 so adjusted that when all of the associated resistance 51, 52, 53 or 54 has been put into the circuit, then the needle 9 will give a zero altitude reading. This is accomplished when the contact arm 61 or the associated photo cell projects in a substantially horizontal direction, provided the light source on the ground is at the same altitude as is the instrument on the plane. It will also be appreciated that the aircraft may approach the landing strip in either direction, although there is only one row of lights 4, since resistances 53 and 54 are for use when the lights are on one side of the plane, and the other two resistances 51 and 52 are for use when the altimeter lights are on the other side.

As above described, my landing system comprises the provision of two rows of lights extending in the direction of the runway and spaced by a known distance from each other, in association with one or more movable photo elements on the aircraft, which are moved angularly to be activated successively by the two rows of lights, and appropriate electrical apparatus governed by a photo element when in that instantaneous angular position at which it is activated, and wherein that angular position is translated as the position and altitude of the aircraft. The operation of the governed apparatus is preferably effected by varying a characteristic in its electrical circuit in a definite relationship to the angularity of the activated photo element.

It will now be appreciated that various modifications may be made in the apparatus to embody the principles of this aircraft guidance system, and that many mechanical and electrical devices may be employed with or substituted for those above described. The system may involve the use of either alternating or direct current, wherein a characteristic of the governed electrical circuit is varied in accordance with variations in the angularity of direction of the activated phototube. Moreover, the lights may be suitably arranged relative to the longitudinal direction of the runway, such as at both sides of the runway and not in the center thereof. If, for example, the row of lights 4 and a second row of lights 4a (Fig. 1) are positioned at equal distances from the center of the runway, then the ammeters can be so calibrated that equal angle measurements for the two positions of one phototube or of two simultaneously activated tubes may represent alignment with the runway as well as being translated as altitude thereover. Various modifications will be suggested by the above disclosure to one skilled in the art. Hence, this disclosure is to be interpreted as illustrating the principles of this landing system and a preferred embodiment of apparatus and not as imposing limitations on the claims appended hereto.

I claim:

1. Apparatus for aiding the landing of aircraft on a runway comprising a line of light extending in the same direction as the runway center line and throughout the effective distance of aircraft approach, electronic apparatus on the craft including a photosensitive element and a shield therefor which limits activation of the element to a unidirectional beam of light, shields for the light which limits its visibilty to an aircraft approaching the runway within a definite vertical angle, a device mounted for angular movement laterally of the direction of craft movement which causes a light beam from said line of light to activate the element for a given position of the device relative to the angularity of the activating light beam, electrical apparatus including a circuit controlled by said electronic apparatus, and means for varying an electrical characteristic in said circuit in accordance with the angular movement of said device, said electrical apparatus being responsive to said variations in the circuit and translating the light angularity as an indication of craft position relative to the runway.

2. Apparatus according to claim 1 in which the line of light is parallel with and spaced from the runway center line by a predetermined distance and the shields prevent activation of the element except when the craft is on the runway side of the light and within a vertical angle of less than 90° from a horizontal plane, said line of light and the associated element on the craft being so located when the craft is on the ground that the element is activated by a substantially horizontal light beam, and the electrical apparatus comprises an altitude indicator which is calibrated according to the angle of the activating light beam to the horizontal.

3. Apparatus for aiding the landing of aircraft on a runway comprising a line of light extending parallel with but spaced by a predetermined distance from the runway center line and at one side of the runway which extends throughout the effective distance of aircraft approach, shields for the line of light which limit its visibility to an aircraft approaching within a vertical angle of less than 90° above a horizontal plane and which opens towards the runway, electronic apparatus on the craft comprising a photosensitive element positioned to be activated by said line of light when the craft approaches for a landing, a shield which limits the activation of the element to a substantially unidirectional beam of light, electrical altitude indicating apparatus including a power circuit and means governed by said electronic apparatus at the time of activation of the element by said light beam which continuously responds to a variation in the directive angularity of the activating light beam and varies an electrical characteristic in the circuit in accordance therewith, said altitude indicating apparatus responding to said variation in the circuit and translating the light beam angle as the altitude of the craft when the craft is over the runway center line.

4. Apparatus for aiding the landing of aircraft on a runway comprising two fixed, widely spaced, parallel lines of light extending throughout the effective distance of and in the direction of the runway approach, electronic apparatus on the craft including at least one photosensitive element, a shield for restricting activation of the element to a unidirectional beam of light, means for causing angular movement of the element and shield in a vertical plane laterally of the direction of flight so that the element may face towards and be activated by a line of light, said electronic apparatus responding to light activation from both lines of light, electrical alignment and altitude indicating devices and a power circuit for each, and means controlled by the electronic apparatus and responsive to a variation in directive angularity of the light beam activating the element which governs the indicating devices in accordance with the directional angularity of the beam when the element is activated by the lines of light.

5. Apparatus for aiding the landing of aircraft on a runway comprising a fixed line of light extending in the same direction as the center line of the landing runway and throughout the effective distance of runway approach, electronic apparatus including a light sensitive element on the aircraft, a shield which restricts activation of the element to a unidirectional beam of light, means for causing angular movement of the element and shield in a substantially vertical plane and laterally of the line of flight, so that the element may face and be activated by the line of light, electrical alignment indicating apparatus having a power circuit including a variable resistance and a contact arm which are relatively movable to vary the resistance according to the directive angularity of the activating light beam, means for causing relative movement between the resistance and contact arm in synchronism with the light sensitive element, and means controlled by the electronic apparatus when the element is activated which controls said circuit and causes the indicating apparatus to respond to the variation in resistance, said indicating apparatus serving to indicate the direction of the light and an alignment of the craft with the runway.

6. Apparatus for aiding the landing of aircraft on a runway comprising two fixed, widely spaced, parallel lines of light extending throughout the effective distance of runway approach, one of which is fixed relative to the runway center line and the other being remote therefrom, two electrically operated devices on the craft which indicate the craft position relative to the runway lights, electronic apparatus including a photosensitive element, a shield for restricting activation of the element to a undirectional beam of light, means for causing angular movement of the element and shield laterally of the direction of flight to angular positions where the element is activated successively by the lines of light, a power circuit for actuating each device, means for successively connecting the power circuit with each device when the photo element is successively activated by the lines of light, and means governed by the directive angularity of the activated element for varying an electrical characteristic of the circuit in a definite relation to said angularity when thus activated by each line of light, so that the instantaneous activation of the photo element by either line of light is translated as the direction thereof.

7. Apparatus for aiding the landing of aircraft on a runway comprising two fixed, widely spaced, parallel lines of light extending throughout the effective distance of runway approach, one of which is fixed relative to the runway center line and the other being remote therefrom, a shield for the runway line of light which directs its rays upwardly within an angle of 30° of a vertical plane, a shield for the remote line of light which directs its rays within an angle of 45° from a horizontal plane, an electrically operated attitude indicator on the craft for indicating the direction of the runway light, an electrically operated attitude indicator related to the remote light, electronic apparatus on the craft includind a photosensitive element, a shield which restricts activation of the element to a unidirectional beam of light, means for causing angular movement of the element and shield laterally of the direction of flight so that the element may face towards and be activated successively by the lines of light, a power circuit controlled by the electronic apparatus for actuating each indicator, means for successively connecting the power circuit with each indicator when the photo element is activated by the related line of light and means for varying an electrical characteristic of the circuit in definite relation to the directional angularity of the photo element when thus activated by each line of light so that the attitude indicator gives the direction of the runway line of light and the other indicator gives the altitude of the craft thereover when the craft is aligned with the runway center line.

8. An apparatus for aiding the landing of aircraft on a runway comprising two fixed, widely spaced, parallel lines of light extending throughout the effective distance of runway approach, one of which is fixed relative to the center line of the runway and the other being remote therefrom, electronic apparatus including at least one photosensitive element on the craft, a shield which restricts activation of the element to a unidirectional beam of light, means for causing angular movement of the element and shield laterally of the direction of aircraft flight so that the element may be activated in succession by said lines of light, shields confining the beams from said lines of light which prevent the phototube from being activated by both simultaneously as the craft approaches for a landing, electrical attitude and altitude indicating devices, a power circuit controlled by the electronic apparatus for operating each indicating device, means for successively connecting the power circuit with the attitude and altitude devices when the photo element is activated respectively by the runway light and by the remote line of light, and means governed by the directive angularity of the photo element and thus activated which varies an electrical characteristic in said circuit in a direct relation to the directive angularity so that each indicating device gives an indication related to the direction of the light which instantaneously activates the photo element.

9. An apparatus for aiding the landing of aircraft on a runway comprising two fixed widely spaced parallel lines of light extending for the effective distance of runway approach, one of which is remote from and parallel with the center line of the runway throughout its effective length and the other line of light being aligned with the runway center line, electronic apparatus including a photosensitvie element and an amplifier on the aircraft, a shield which restricts activation of the element to a unidirectional beam of light, means including a pivotal support for causing angular movement of the element and shield in a substantially vertical plane and laterally of the direction of flight so that the element is activated successively by the lines of light, shields for the lights which prevent their activating the element simultaneously, two separate electrical devices for indicating craft altitude and its attitude relative to the runway center line, a power circuit controlled by the electronic apparatus for operating each device, means for serially connecting said power circuit to said attitude indicating device when the photo element points towards the center line light and to the altitude indicating device when the photo tube points toward the remote line of light, and means for varying the power input to each indicating device in a direct relation to the directive angularity of the photo element when activated, so that when the attitude indicator shows that the craft is flying in alignment with the center line the altitude indicator will indicate the altitude of the craft over the runway.

10. Aircraft apparatus comprising a line of lights spaced from and parallel with the center line of a landing runway and extending throughout the effective distance of runway approach, an electronic phototube and amplifier, a relay controlled by the amplifier, a shield which restricts activation of the tube to a unidirectional beam of light, means for mounting the tube on the craft for angular movement laterally of the direction of flight to a directive position where it is activated by said light, electrically operated apparatus governed by the relay when the tube is activated which includes a power circuit having a variable resistance therein and a contact member, means to move the contact member in timed relation with the phototube which varies the resistance in a direct relation to a change in direction of the tube when activated, and gyroscopic means to prevent a variation of the resistance in the circuit by a lateral tilting of the craft.

11. Apparatus according to claim 10 in which the resistance is fixed in position on the aircraft and said power circuit includes a second compensating resistance in series with the first and a gyroscopically moved contact arm for varying said compensating resistance so as to neutralize the effect of lateral tilting of the aircraft.

12. Apparatus for aiding the landing of aircraft on a runway comprising two fixed, widely spaced lines of light extending throughout the effective distance of runway approach and parallel with the center line thereof, an electronic circuit on the aircraft including a phototube, an amplifier and a relay, a shield which restricts activation of the tube to a unidirectional beam of light, means for moving the tube laterally of the line of flight so that it is periodically and successively activated by said lines of light when the aircraft approaches the runway for a landing, two electrically operated indicators, a power circuit governed by the relay for operating each indicator, two variable resistances, each being connectable in the circuit with an associated indicator, and means including a contact arm moving in a definite relation with the angular position of the phototube which varies the resistances and connects each periodically with its associated indicator so that the indicators are governed in accordance with the instantaneous directive angularity of the phototube when activated.

13. Apparatus for aiding the landing of aircraft on a runway comprising a fixed line of light extending in the same direction as the runway center line throughout the effective distance of runway approach, an electronic amplifier circuit including a photosensitive element on the aircraft, a shield which restricts activation of the element to a unidirectional beam of light, means for moving the element and shield rapidly and laterally of the direction of flight so that the element is periodically activated by the light and provides a succession of electrical impulses, a dampened electrical indicator and a power circuit therefor, electrical means governed by the electronic circuit which renders the indicator power circuit periodically operative, and means governed by the directive angularity of the element when activated which varies an electrical characteristic in the power circuit in a direct relation to a variation in said angularity so that the indicator gives a substantially dampened indication of the position of the craft relative to the light.

14. Apparatus for aiding the landing of aircraft on a runway comprising two fixed, widely spaced, parallel lines of light extending throughout the effective distance of runway approach, one of which is fixed relative to the runway center line and the other being remote therefrom, a shield for the runway line of light which directs its rays upwardly within an angle of about 30° from a vertical plane, a shield for the remote line of light which directs its rays within an angle of about 45° from a horizontal plane, an electrically operated, dampened indicator on the craft for indicating the craft attitude relative to the runway light, an electrically operated dampened altitude indicator, an electronic circuit on the craft including a phototube, an amplifier and a relay, a shield which restricts activation of the tube to a unidirectional beam of light, means for revolving the phototube rapidly and laterally of the line of flight so that it is activated successively by the two lines of light, and a power circuit governing the indicators and rendered operable by the relay, which power circuit includes a resistance arm movable in angular relation with the phototube and two variable resistances, said arm variably connecting one resistance with the attitude indicator when the phototube is activated by the runway light and the other resistance with the altitude indicator when the phototube is activated by the remote light so that each indicator reading is directly controlled by the variable resistance in the circuit at the moment of phototube activation, said rate of revolution of the phototube being so rapid that each dampened indicator gives a substantially steady reading related to the angularity of the phototube at its moment of periodic activation.

15. Apparatus for aiding the landing of aircraft on a runway comprising a line of light spaced at a known distance from and parallel with the center line of the runway and extending throughout the effective distance of runway approach, an electronic apparatus on the craft including a photosensitive element, means including a movable shield which excludes ambient light and restricts activation of the element to a unidirectional beam from said line of light, means for causing angular movement of the shield in a vertical plane laterally of the direction of flight so that the element may be activated by a beam from said line of light, an electrically operated altimeter having a movable indicator and scale calibrated to translate the directional angle of the light beam to the activated photo element and the distance of the light from the runway center line as altitude, a power circuit for the altimeter and means governed by the electronic apparatus in response to the angular movement of the shield to a position of element activation which controls said circuit and causes the altimeter to indicate the altitude when the craft is aligned vertically with the runway center line.

ROBERT J. HERBOLD.

REFERENCES CITED

The following references are of record in the file of this patent:

UNITED STATES PATENTS

| Number | Name | Date |
|---|---|---|
| 1,787,992 | McIlvaine | Jan. 6, 1931 |
| 1,864,638 | Chilowsky | June 28, 1932 |
| 2,070,178 | Pottenger, Jr., et al. | Feb. 9, 1937 |
| 2,077,398 | Clark | Apr. 20, 1937 |
| 2,133,241 | Baker | Oct. 11, 1938 |
| 2,179,570 | Zublin | Nov. 14, 1939 |
| 2,196,139 | Carlson | Apr. 21, 1940 |
| 2,206,036 | Herson | July 2, 1940 |
| 2,216,716 | Withem | Oct. 1, 1940 |
| 2,280,126 | Metcalf | Apr. 21, 1942 |
| 2,297,534 | Brulin | Sept. 29, 1942 |
| 2,361,956 | Moseley | Nov. 7, 1944 |
| 2,366,939 | Smith | Jan. 9, 1945 |

FOREIGN PATENTS

| Number | Country | Date |
|---|---|---|
| 104,888 | Australia | Feb. 7, 1937 |
| 501,963 | Germany | July 8, 1930 |

Certificate of Correction

Patent No. 2,489,218      November 22, 1949

ROBERT J. HERBOLD

It is hereby certified that errors appear in the printed specification of the above numbered patent requiring correction as follows:

Column 12, line 12, for the word "limits" read *limit*; column 14, lines 5 and 6, for "attitude" read *altitude*; line 7, for "includind" read *including*; line 52, for "and thus" read *when thus*; line 67, for "photosensitvie" read *photosensitive*; column 16, line 13, strike out "substantially";

and that the said Letters Patent should be read with these corrections therein that the same may conform to the record of the case in the Patent Office.

Signed and sealed this 28th day of March, A. D. 1950.

[SEAL]

THOMAS F. MURPHY,
*Assistant Commissioner of Patents.*